United States Patent
Doan et al.

(10) Patent No.: US 6,754,066 B2
(45) Date of Patent: Jun. 22, 2004

(54) UPS CABINET AND METHOD OF ASSEMBLY

(75) Inventors: Kylam D. Doan, Laguna Niguel, CA (US); Ron Williams, Fountain Valley, CA (US); James K. Martin, Columbus, OH (US); Randall Mathis, Columbus, OH (US); Mike Harper, Galloway, OH (US)

(73) Assignee: Liebert Corporation, Columbus, OH (US)

(*) Notice: Subject to any disclaimer, the term of this patent is extended or adjusted under 35 U.S.C. 154(b) by 106 days.

(21) Appl. No.: 10/055,818

(22) Filed: Oct. 25, 2001

(65) Prior Publication Data

US 2003/0011969 A1 Jan. 16, 2003

Related U.S. Application Data

(60) Provisional application No. 60/243,998, filed on Oct. 27, 2000.

(51) Int. Cl.[7] ............................................. H02B 1/00
(52) U.S. Cl. ..................... 361/600; 361/603; 361/623; 361/624; 361/648; 361/679; 361/829; 361/836
(58) Field of Search ........................... 361/600, 115, 361/601, 603, 611, 620, 673, 674, 637–640, 641–642, 648–650, 676, 679, 690, 694–695, 829–836; 29/434

(56) References Cited

U.S. PATENT DOCUMENTS

| | | | | |
|---|---|---|---|---|
| 3,898,537 A | * | 8/1975 | Mayse et al. | 361/824 |
| 5,025,545 A | * | 6/1991 | Brown | 29/434 |
| 5,184,280 A | * | 2/1993 | Fouad | 361/648 |
| 5,185,705 A | * | 2/1993 | Farrington | 361/115 |

* cited by examiner

Primary Examiner—Gregory D. Thompson
(74) Attorney, Agent, or Firm—Howery Simon Arnold & White LLP

(57) ABSTRACT

A cabinet for an uninterrupted power source (UPS) is disclosed. The cabinet has three portions that characterize the frame. A front portion contains capacitor assemblies, power DC Link, power electronic components, and a control panel. The control panel and power DC Link are situated for front access and cover the power electronic components and capacitors. A rear portion holds a plurality of magnetic components. The magnetic components are accessible from the back of the cabinet and can be installed last in the assembly of the cabinet and configured for a specific voltage rating. A bus portion is divided from the front and rear portions and contains the bus bars for electrical connection of the UPS.

23 Claims, 9 Drawing Sheets

UPS CABINET AND METHOD OF ASSEMBLY

CROSS-REFERENCE TO RELATED APPLICATIONS

This application claims the benefit of the Provisional Application Serial No. 60/243,998 filed Oct. 27, 2000.

BACKGROUND OF THE INVENTION

1. Field of the Invention

The present invention relates generally to an uninterruptible power supply (UPS) and, more particularly to a cabinet containing an uninterruptible power supply.

2. Relation to Prior Art

AC commercial power is used as a primary power source for computers and other data processing equipment that in turn use stored program and solid state technology. These circuits are generally very sensitive to input power variations from a desired standard waveform. However, commercial AC power waveforms are subject to many variations due to the demands of other users on the power line and other factors. Typical undesirable variations are over-voltage, under-voltage, voltage outages and signal transients. Undesirable variations also occur due to load conditions, as well as line conditions.

Typically, UPS's include a battery backup as a secondary or reserve power source, which is activated to supply power to the load upon total failure of the commercial power or significant degradation of the primary power source. A power inverter is used in the UPS to convert the DC power delivered by the batteries into AC power.

FIG. 1 shows a conventional, prior art cabinet arrangement for a UPS. The UPS has a cabinet 10. The cabinet has a plurality of bus bars 20 for connection to a load, such as a computer network (not shown). Typically, the magnetic components 30 for the UPS, such as transformers, autotransformers and inductors, are located in a lower portion or bottom of the cabinet. Separate cabinets are frequently used to hold other magnetic components, such as input transformers and bypass inductors (not shown). Capacitor assemblies 40 are typically above magnetic components 30 in cabinet 10. Power hardware electronics and controls 50, such as inverters and rectifiers, then lie above the magnetic components and the capacitor assembly.

In the typical UPS cabinet, the magnetic components 30 are first to be placed into the cabinet during assembly. Because magnetic components 30 are voltage specific, the installation of the magnetic components determines the voltage rating of the UPS unit. Because the electronic components are typically the same for multiple voltage configurations, it would be desirable to have a UPS cabinet in which the magnetic components could be installed as a last step of the manufacturing process.

The present invention is directed to overcoming, or at least reducing the effects of, one or more of the problems set forth above.

SUMMARY OF THE INVENTION

In view of the foregoing and other considerations, the present invention relates to a cabinet containing an uninterruptible power supply.

In accordance with one aspect of the present invention, there is provided a method of assembling an uninterruptible power supply. An initial step includes assembling a frame defining three portions. A plurality of bus bars install in a first portion of the frame. The bus bars are accessible through the first portion of the cabinet. A capacitor assembly installs in a second portion of the frame. A power assembly also installs in the second portion. The power assembly is accessible through the second portion. A power electronic component panel mounts in the second portion. A control panel mounts adjacent to the power electronic components in the second portion. The control panel is accessible through the second portion. A plurality of magnetic components install in a third portion of the frame. The plurality of magnetic components are accessible through the third portion of the cabinet.

BRIEF DESCRIPTION OF THE DRAWINGS

The foregoing, preferred embodiment and other aspects of the present invention will be best understood with reference to a detailed description of specific embodiments of the invention, which follows, when read in conjunction with the accompanying drawings, in which.

Figure 1:
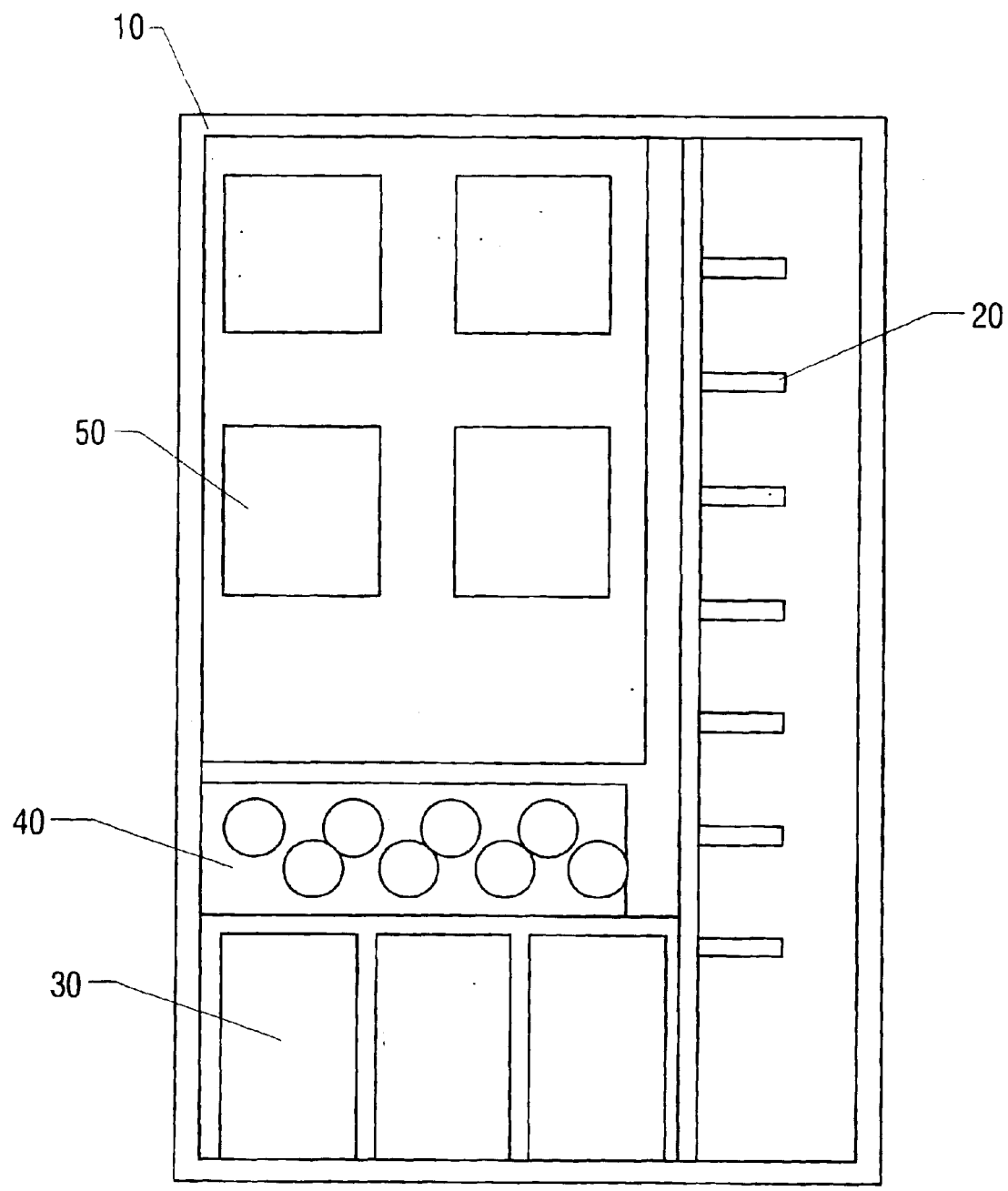
FIG. 1 illustrates a conventional cabinet arrangement for an uninterruptible power supply (UPS) as evidenced in the prior art.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modification, equivalents and alternatives falling within the scope of the invention as defined by the appended claims.

DETAILED DESCRIPTION OF THE INVENTION

Figure 2:
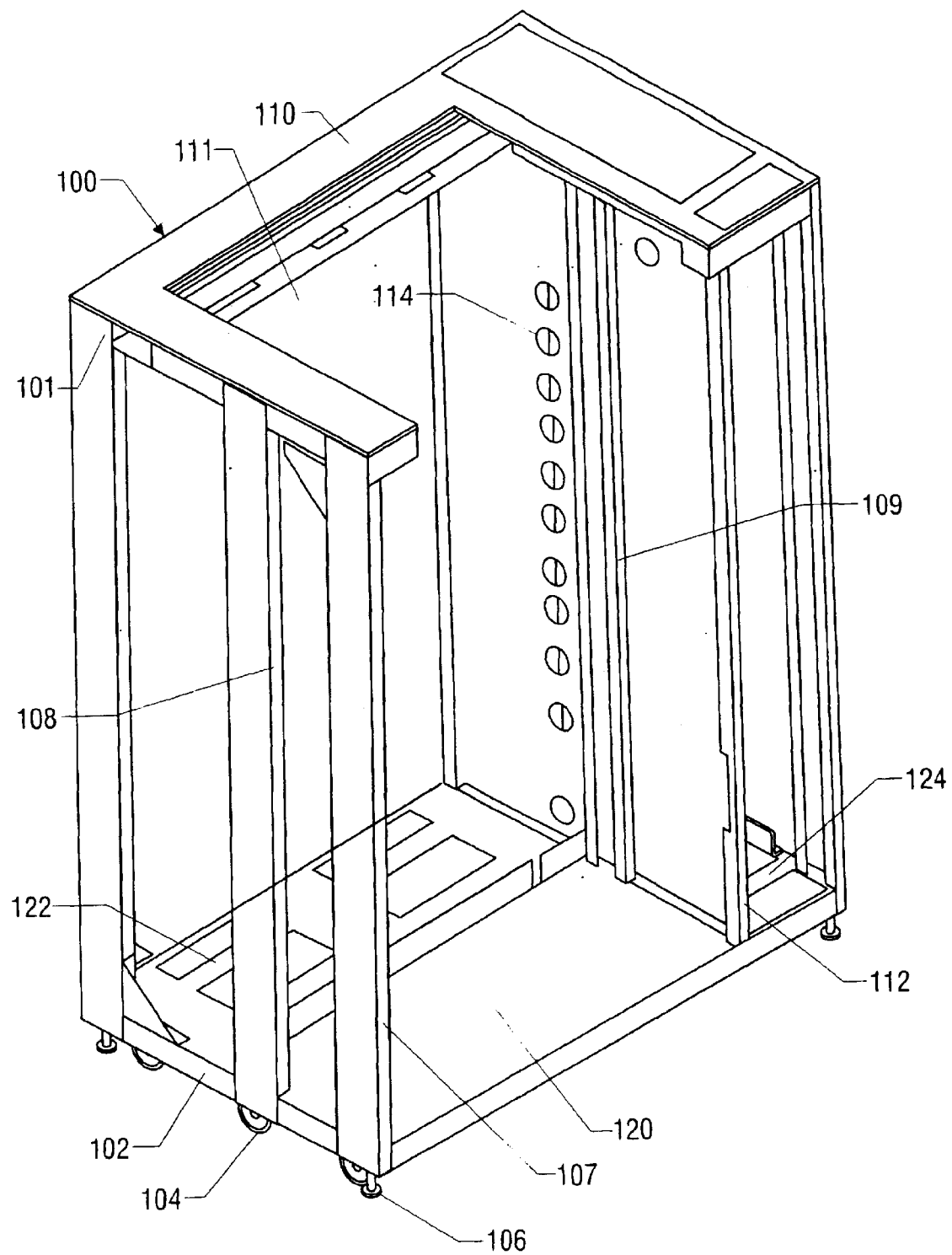
FIG. 2 illustrates an isometric view of a frame for an UPS cabinet according to the present invention.

FIG. 2 illustrates an isometric view of a frame 100 for an UPS cabinet according to the present invention. Components of frame 100 may be of galvanized metal and are attached by pop rivets 101. Pop-riveted construction allows the cabinet components to be shipped flat. Frame 100 has a base 102. The base has a plurality of casters 104 and stands 106. During assembly of the cabinet, a plurality of posts 107 connects to the corners of base 102 and support ceiling 110. Ceiling 110 may have an opening 111 for locating a cooling unit or fans (not shown) in the top of frame 100.

A dividing wall 112 also connects to base 102 and ceiling 110 of frame 100. A post 108 on the side of the frame and opposing post 109 on dividing wall 112 separate the cabinet into a front portion 120 and a back portion 122. A bus bar portion 124 lies on the other side of dividing wall 112. Dividing wall 112 has a series of access or conduit openings 114 for connection of electronics in back portion 122 to the bus portion 124.

Figure 3:
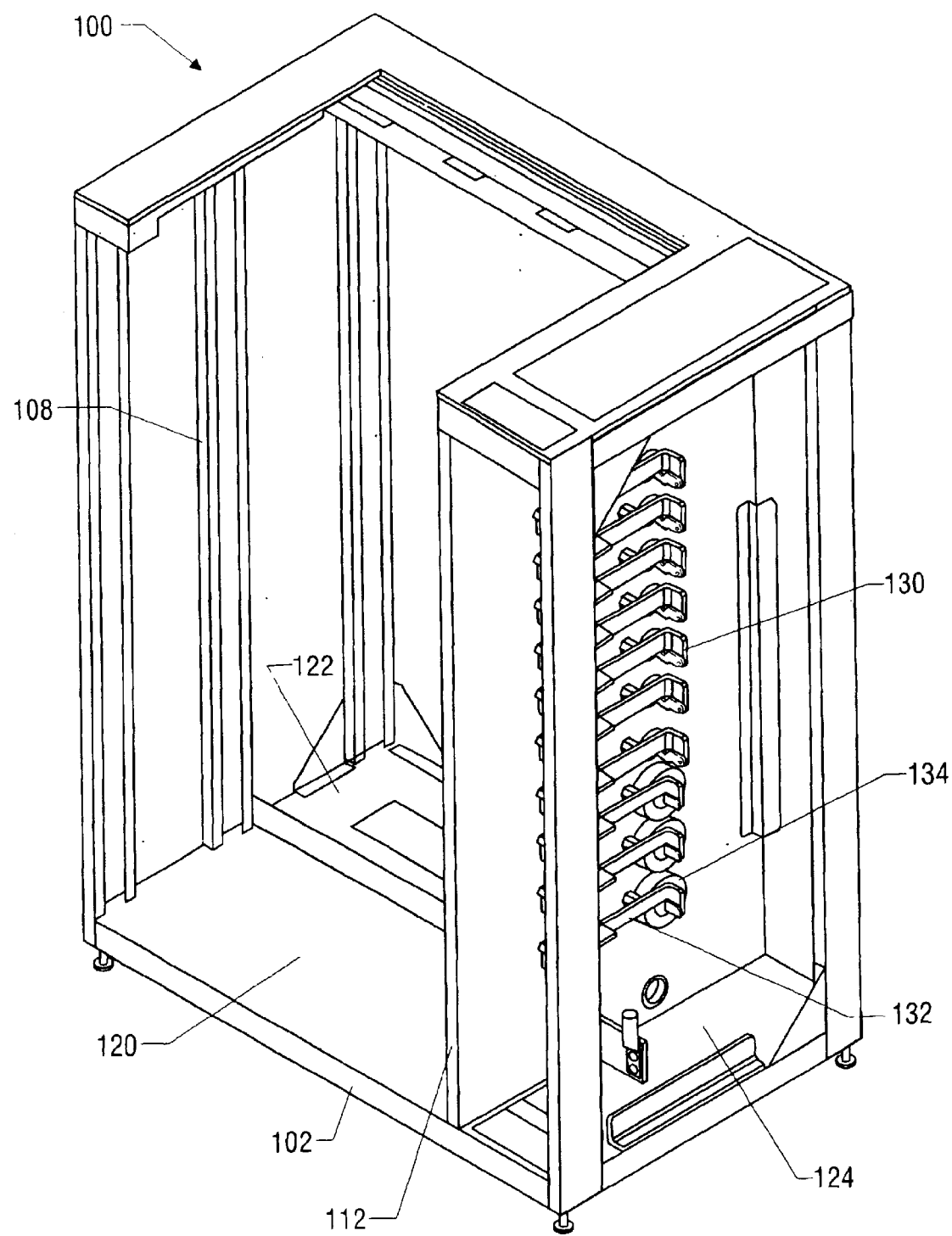
FIG. 3 illustrates another isometric view of the UPS cabinet with the bus bars installed.

FIG. 3 illustrates another isometric view of the UPS cabinet during the process of assembly. With frame 100 assembled as shown in FIG. 3, bus bars 130 are installed on dividing wall 112 on the side of bus bar portion 124. Bus bars 130 have a bar 132 mounted on dividing wall 112 by insulator 134.

Figure 4:
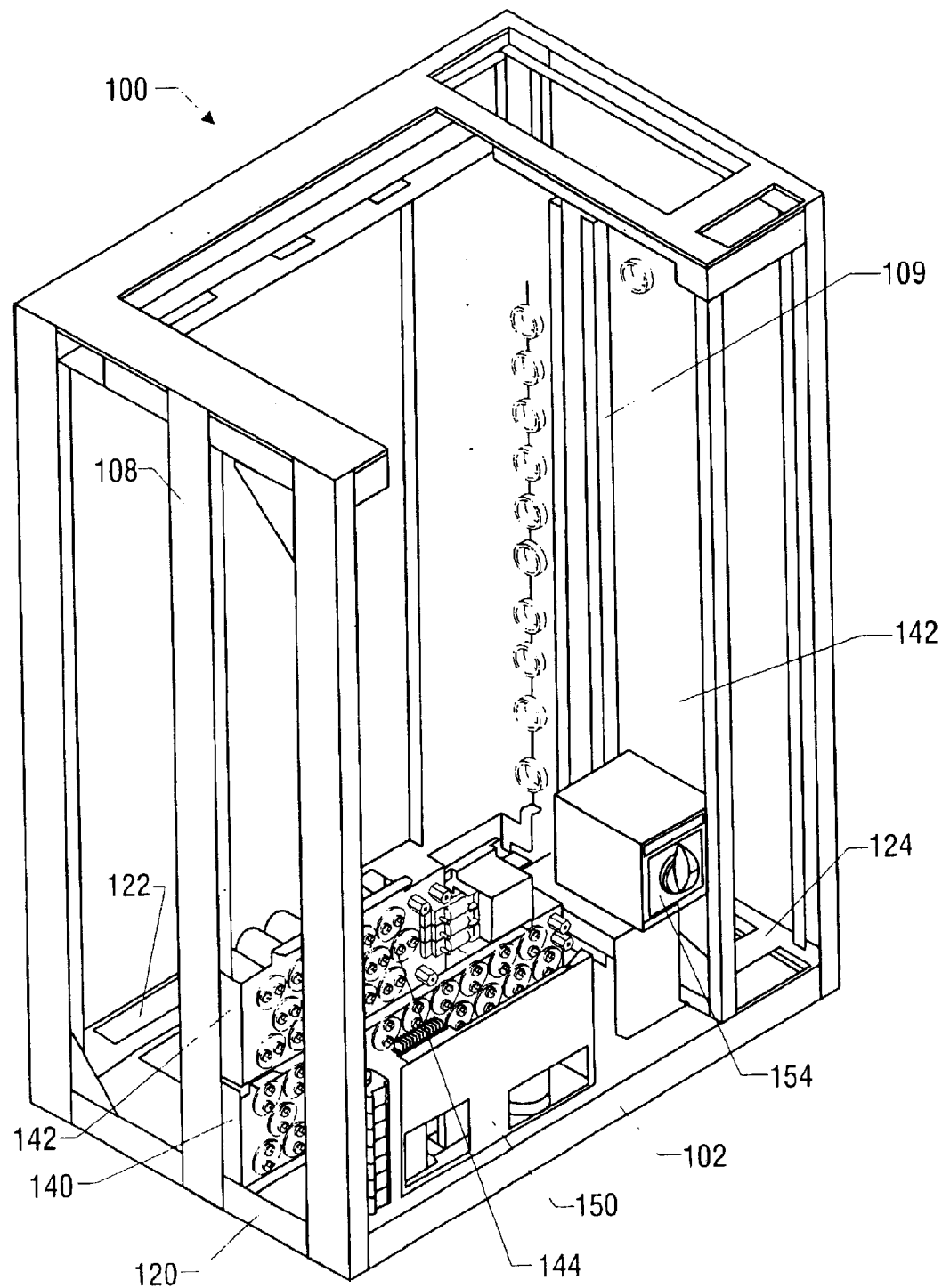
FIG. 4 illustrates the isometric view of the UPS cabinet with the capacitor assemblies and power DC Link installed.

FIG. 4 illustrates an isometric view of the UPS cabinet and frame 100 in a next step of assembly. Capacitor assemblies 140, 142 and power DC link 150 install in front portion 120 of the cabinet. A first capacitor assembly 140 contains a plurality of capacitors arranged in a matrix. First capacitor assembly 140 connects to base 102 and post 108 in front portion 120 of the cabinet. A second capacitor assembly 142 fits above first capacitor assembly 140 and to post 108. Capacitor sub-assembly components 144 are connected as well.

In front portion 120, power DC Link 150 connects to base 102 near the front the cabinet. Full access to power DC Link 150 can be achieved from the front of the cabinet allowing servicing and maintenance from the front of the cabinet. Power DC Link 150 contains components, such as capacitors, necessary for connecting the UPS to the battery power supply. A control switch 154 for setting operation or service modes installs in front portion 120 for front accessibility as well.

Figure 5A:
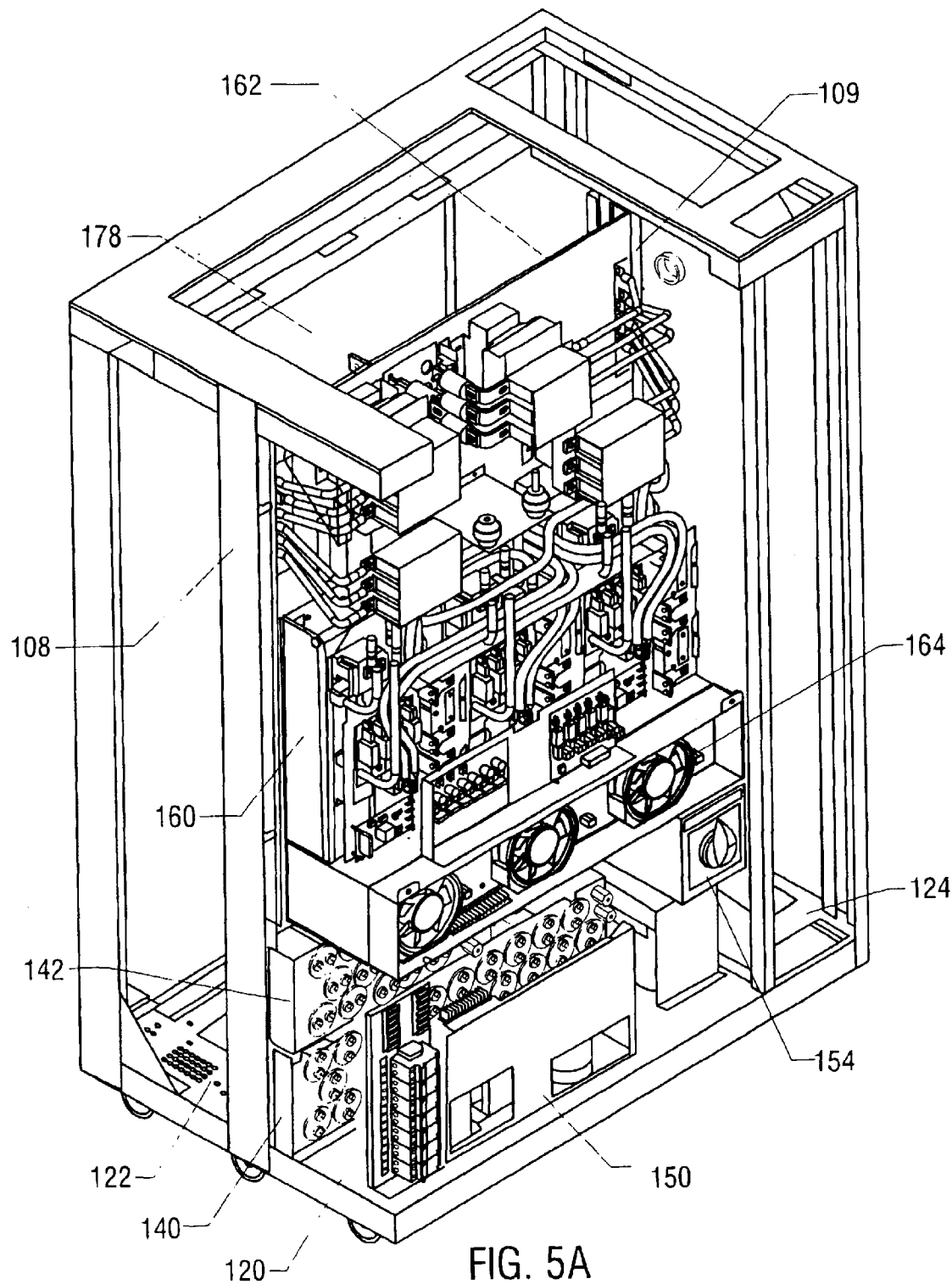
FIG. 5A illustrates the isometric view of the UPS cabinet with the power electronics installed.

FIG. 5A illustrates the isometric view of the UPS cabinet in a next stage of assembly. Power electronic components 160 install in front portion 120. Power electronic components 160, such as rectifiers and inverters mount to panel 162. Panel 162 attaches to side post 108 and 109 and fits above capacitor assemblies 140, 142. A fan unit 164 may be further provided on panel 162 to cool the electronic components and draw air from the front of the cabinet.

Figure 5B:
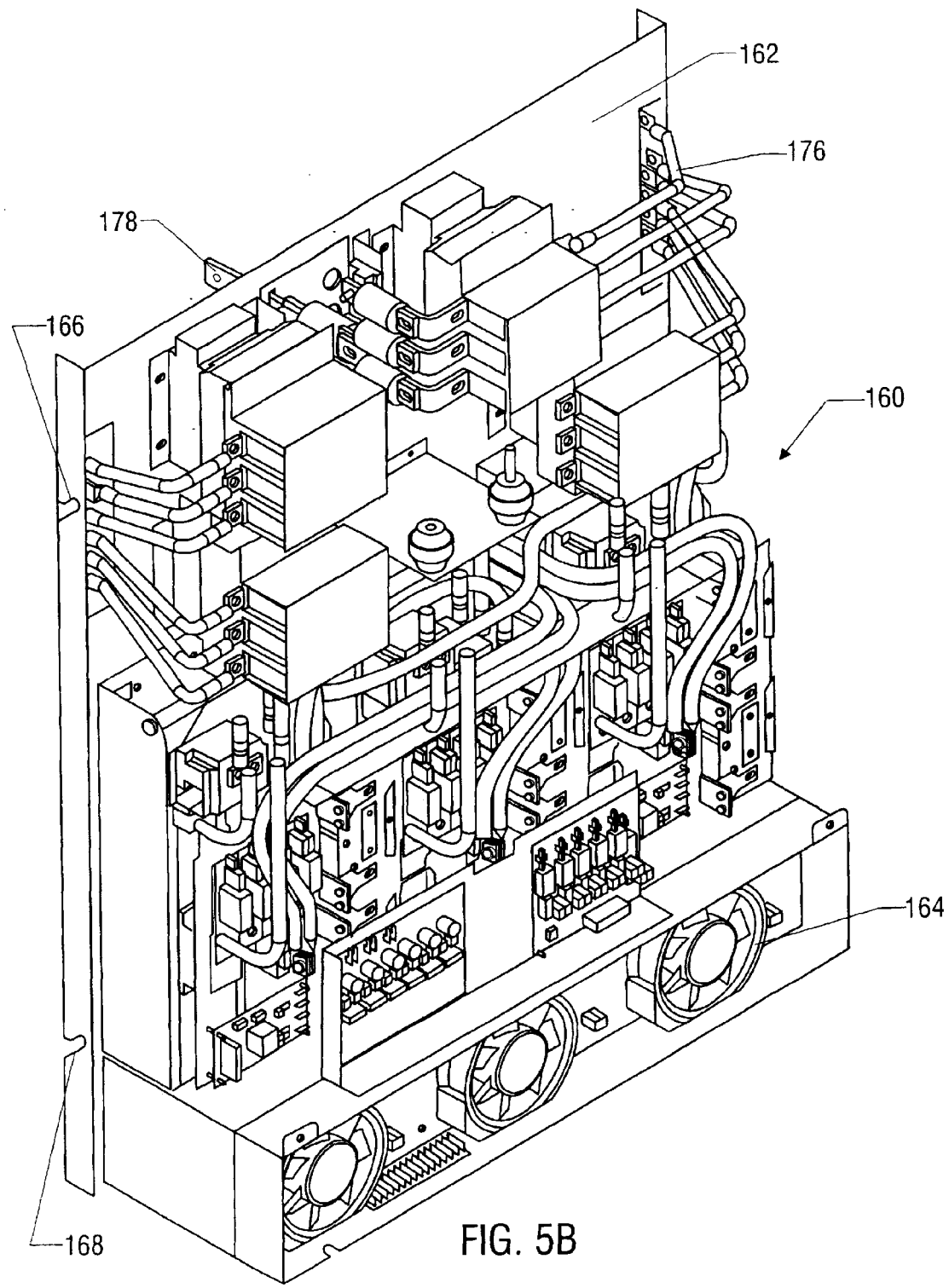
FIG. 5B illustrates the isometric view of the power electronics.

Referring to the detail of power electronic components 160 in FIG. 5B, panel 162 has hooks 166 and 168 on one edge and additional hooks (not shown) on the opposite edge. The hooks allow the panel to be prefabricated and connected to the posts as shown in FIG. 5A. Panel 162 can be assembled independently of the frame. The power electronic components may be used with various voltage configurations and lends themselves well to a modular panel. Panel 162 with power electronic components 160 simply sets in the UPS cabinet during manufacture.

Having power electronic components 160 on panel 162 offers a manufacturing advantage due to the modular design of the power electronics on the panel. Connections such as connection 178 and wires 176 visible in FIG. 5B project through panel 162 and into rear portion 122 keeping high voltage connections in the back portion of the cabinet.

Figure 6:
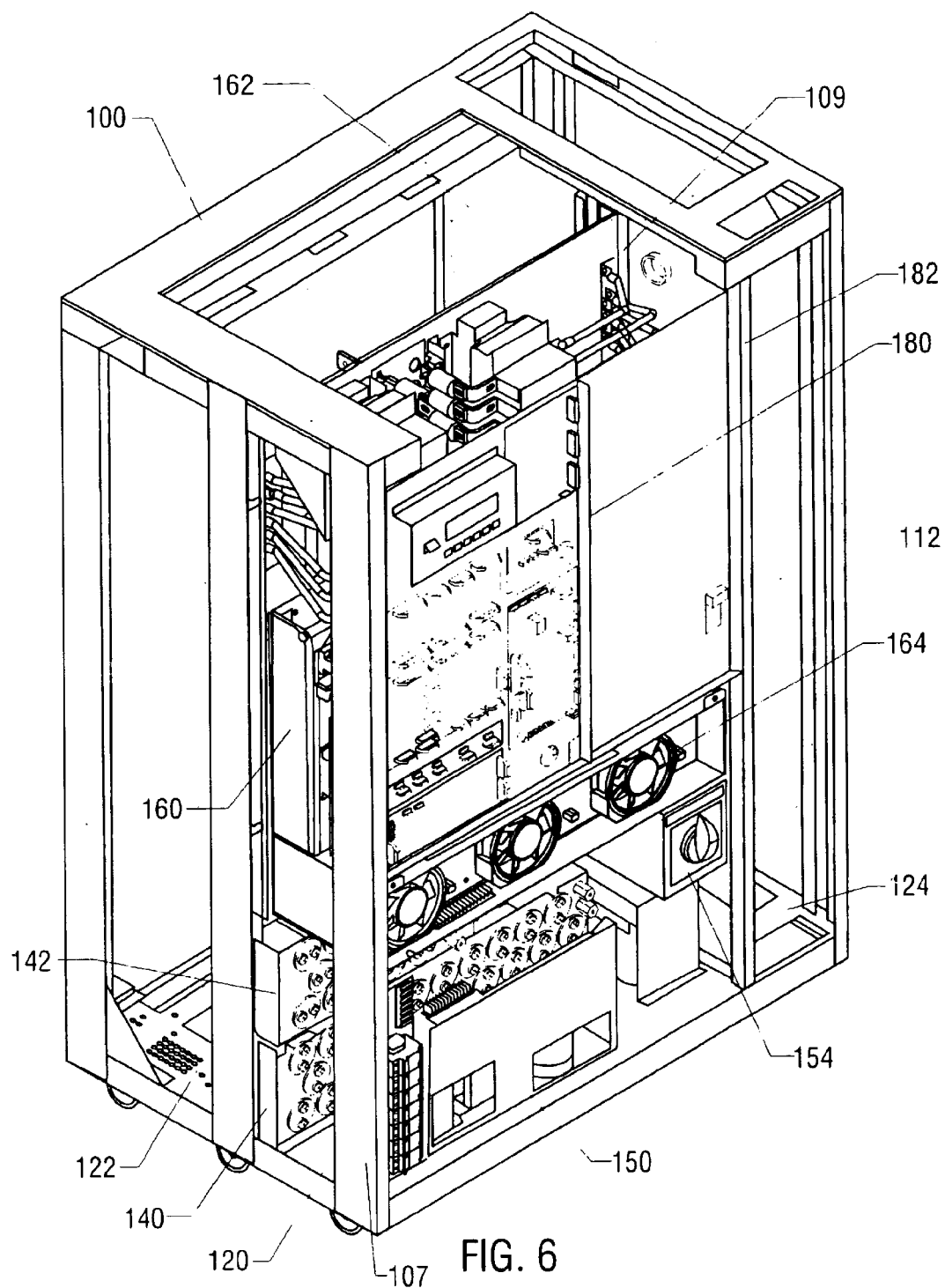
FIG. 6 illustrates the isometric view of the UPS cabinet with the control panel installed.

FIG. 6 illustrates the isometric view of the UPS cabinet in a following step of assembly. A control panel 180 installs in front portion 120. Control panel 180 attaches to the front of the frame and connects to corner post 107 and dividing wall 112. The control panel may attach by hinges. No high voltage is accessible on control panel 180, so as not to expose personnel accessing the UPS from the front of the unit to high voltage connections or components.

Figure 7:
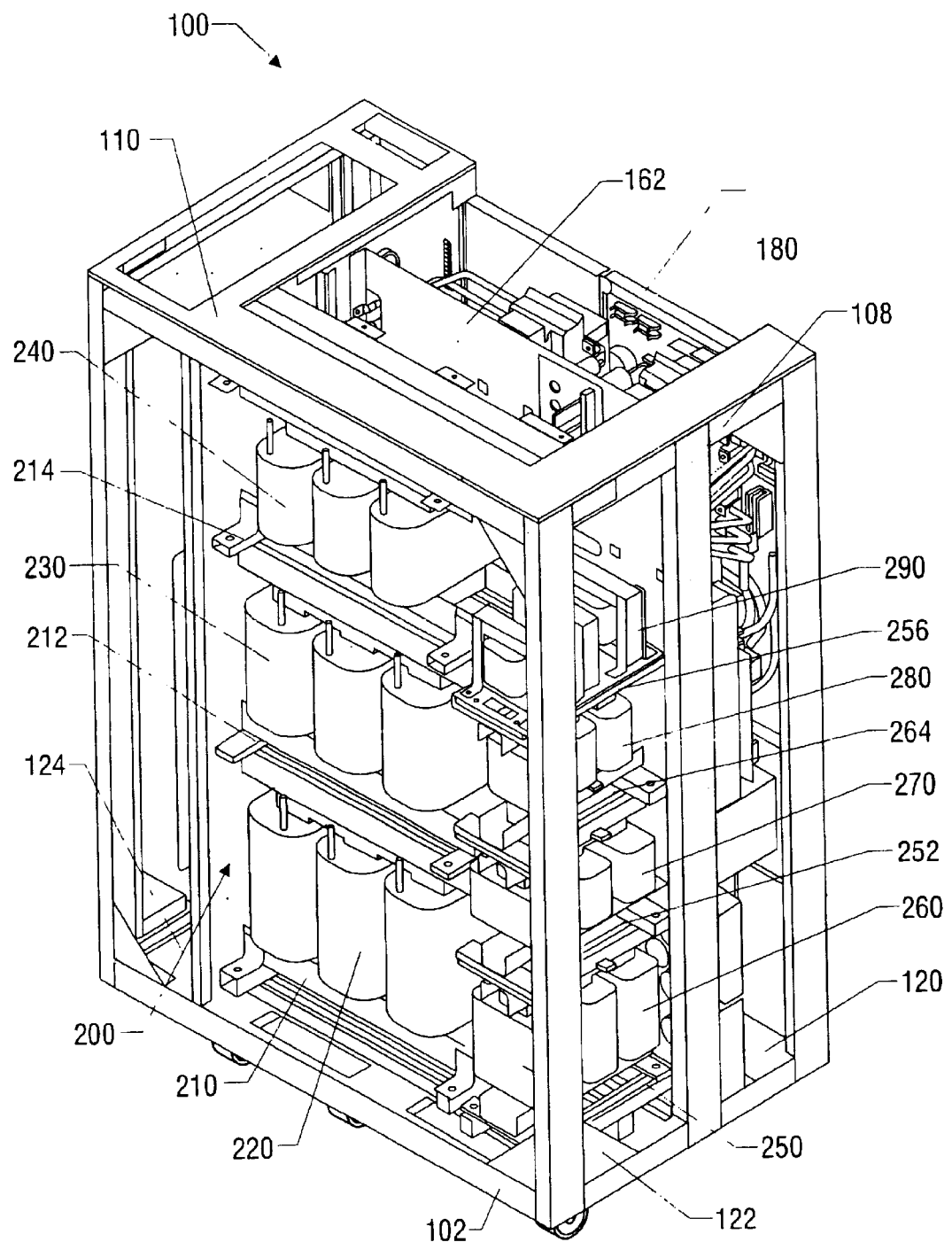
FIG. 7 illustrates an isometric view of the back of the UPS cabinet with the magnetic components installed.

FIG. 7 illustrates an isometric view of the back of the UPS cabinet. Magnetic components 200 install in rear portion 122 of frame 100. Adding magnetic components 200 as a final step of the assembly of the cabinet allows the UPS to be configured for a specific voltage selection. Because the magnetic components determine the voltage rating of the UPS, other components of the assembly, such as the capacitor assemblies, power electronic components and control door may be mass produced independently of the cabinet. Adding the magnetic components as a final step provides the opportunity during manufacture to tailor assembly of the UPS cabinet to specific client needs or pending orders.

Transformers stack on three tiers 210, 212 and 214 that form racks from base 102 to ceiling 210 in back portion 122. In the present embodiment, access to the three tiers for magnetic components 200 can be achieved from the back of the cabinet. In this way, magnetic components 200 can be installed last in the assembly of the UPS. Having the ability to install magnetic components 200 near the end of assembly allows the UPS to be configured for various voltage ratings.

First tier 210 includes a rack that holds an output transformer 220. Second tier 212 includes a rack that holds an input autotransformer 230. Third tier 214 includes a rack that holds a bypass autotransformer 240. Additionally, a series of inductor and filter racks 250, 252, 254 and 256 install in back portion 122 of frame 100. These racks also have rear accessibility. Rack 250 holds a plurality of input inductors 260. Rack 252 holds a plurality of output inductors 270. Rack 254 may also hold a plurality of inductors used in an input filter, and rack 256 may hold other optional components. The arrangement of tiers 210–214 in rear portion 120 allows bypass transformer 240 and input transformer 230 to be included in the cabinet, which may not be available in conventional UPS cabinets.

Figure 8:
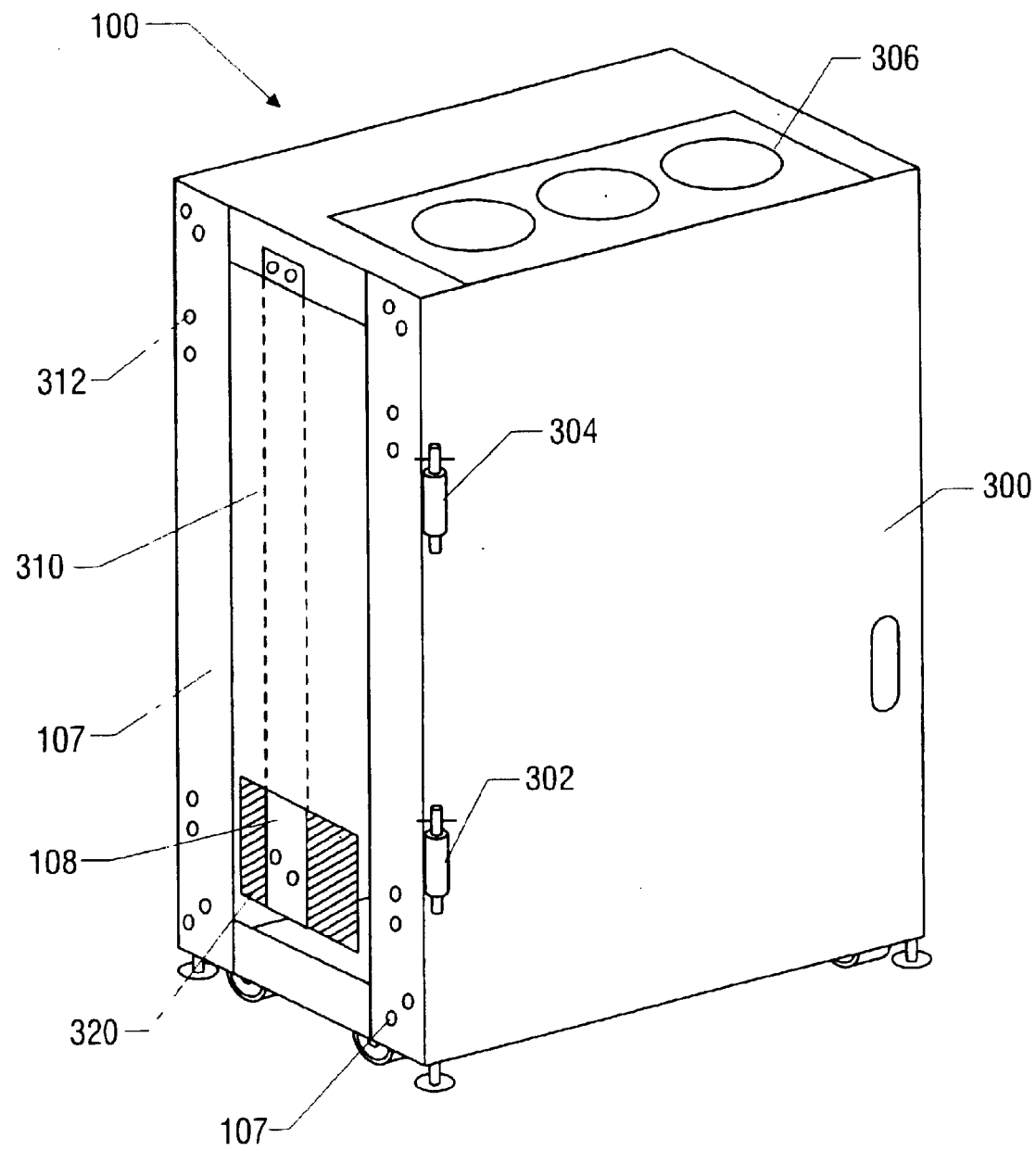
FIG. 8 illustrates the UPS cabinet after final assembly.

FIG. 8 illustrates the UPS cabinet after final assembly. Frame 100 of the UPS cabinet has been fitted with a cover door 300. Hinges 302, 304 affix door 300 to the frame. Hinges 302, 304 allow door 300 to be removed during maintenance procedures. Additionally, the hinges may be used is either a left or right hand arrangement for opening the door. A fan unit 306 having a plurality of fans and a protective screen installs in the top of the frame.

Protective and cosmetic panels may be added to the sides and rear of the frame. In FIG. 8, the left side of the UPS has a protective panel or bulkhead 310 added. Corner posts 107 and dividing post 108 are partially exposed. Unlike a cosmetic panel that covers the entire side of the cabinet, bulkhead 310 allows for attachment of another cabinet (not shown) to the frame of the UPS.

Specifically, corner posts 107 have a plurality of boltholes 312 along their length that align with boltholes in an adjacent frame of an ancillary cabinet. Bolts (not shown) attach the ancillary cabinet to the UPS frame. Bulkhead 310 provides an interior barrier between the adjoined cabinets and has a wiring conduit 320 for passage of wires (not shown) between the adjoined cabinets.

While the invention has been described with reference to the preferred embodiments, obvious modifications and alterations are possible by those skilled in the related art. Therefore, it is intended that the invention include all such modifications and alterations to the full extent that they come within the scope of the following claims or the equivalents thereof.

What is claimed is:

1. A method of assembling an electronic device having both electric and magnetic components, comprising the steps of:

assembling an enclosure for said electronic device;

installing said electric components by attaching at least a portion of said electric components on a power panel and hooking said power panel in said enclosure;

determining a voltage rating; and subsequent to installing said electric components, installing said magnetic components corresponding to said voltage rating in said enclosure.

2. The method of claim 1 further comprising installing a capacitor assembly in said enclosure before hooking said power panel in said enclosure.

3. The method of claim 2, wherein installing said capacitor assembly in said enclosure comprises the step of installing said capacitor assembly adjacent a floor of said enclosure before hooking said power panel in said enclosure substantially above said capacitor assembly.

4. The method of claim 1 further comprising attaching a control panel adjacent said power panel in a front interior portion of said enclosure.

5. The method of claim 1 wherein installing said magnetic components in said enclosure comprises mounting said magnetic components on a plurality of racks attached in a rear interior portion of said enclosure.

6. A method of assembling an electronic device having both electrical and magnetic components, comprising the steps of:

assembling an enclosure for said electronic device;

installing said electric components, wherein said electric components include a panel-mounted power electronics assembly attached to an interior of said enclosure by a hook;

determining a voltage rating; and subsequent to installing said electric components, installing said magnetic components corresponding to said voltage rating in said enclosure.

7. The method of claim 6 wherein said enclosure is assembled by pop-riveting.

8. The method of claim 6 wherein said electric components include a capacitor assembly.

9. A The method of claim 6 wherein said electric components include a control panel having no exposed high voltage on a front portion of said control panel.

10. The method of claim 6 wherein said magnetic components are installed as the final step of assembling the electronic device.

11. The method of claim 6 wherein said magnetic components are accessible from a rear portion of said electronic device.

12. The method of claim 6 wherein said magnetic components comprise a transformer.

13. A cabinet having an interior and housing:

a panel hooked in said interior of said cabinet;

a plurality of electric components attached to said panel; and a plurality of magnetic components attached to said interior of said cabinet, wherein said magnetic components are accessible from an exterior of said cabinet.

14. The cabinet of claim 13, said magnetic components comprise at least one transformer.

15. A cabinet housing an uninterruptible power supply, said cabinet having an interior divided into at least three portions including:

a first portion having at least one bus bar affixed to a wall therein;

a second portion having power electronic components therein, wherein said power electronic components include a panel attached by a hook means to said interior of said second portion; and a third portion having a plurality of magnetic components disposed about said interior of said third portion.

16. The cabinet of claim 15 wherein said power electronic components include a capacitor module.

17. The cabinet of claim 15 wherein said magnetic components include at least one transformer.

18. A cabinet housing an uninterruptible power supply, the cabinet having an interior and comprising:

a wall attached in the interior of the cabinet and substantially dividing a side interior portion from a remainder of the interior of the cabinet;

at least one bus bar affixed to a side of the wall in the side interior portion;

a plurality of electric components disposed in a front interior portion of the remainder of the cabinet; and a plurality of magnetic components disposed in a rear interior portion of the remainder of the cabinet.

19. The cabinet of claim 18 wherein the plurality of electric components include power electronic components installed on a power panel, the power panel attaching by a hook to the interior of the cabinet and substantially separating the power electronic components in the front interior portion from the magnetic components in the rear interior portion.

20. The cabinet of claim 19 wherein the plurality of electric components include a capacitor assembly installed in the front interior portion of the interior adjacent a floor of the cabinet.

21. The cabinet of claim 19 further comprising a control panel attaching in the front interior portion of the cabinet adjacent the power panel.

22. The method of claim 18 wherein the plurality of magnetic components are mounted on at least one rack attached in the rear interior portion of the cabinet.

23. The method of claim 18 wherein the magnetic components are accessible from a rear of the cabinet for installing the magnetic components in a final step when assembling the cabinet.

* * * * *